(12) United States Patent
Easterly et al.

(10) Patent No.: US 8,326,753 B2
(45) Date of Patent: *Dec. 4, 2012

(54) METHOD FOR FACILITATING FINANCIAL AND NON FINANCIAL TRANSACTIONS BETWEEN CUSTOMERS, RETAILERS AND SUPPLIERS

(76) Inventors: Frank Easterly, Midlothian, VA (US); Clifford Mason, Columbus, GA (US)

(*) Notice: Subject to any disclaimer, the term of this patent is extended or adjusted under 35 U.S.C. 154(b) by 21 days.

This patent is subject to a terminal disclaimer.

(21) Appl. No.: 13/195,404

(22) Filed: Aug. 1, 2011

(65) Prior Publication Data

US 2011/0288943 A1   Nov. 24, 2011

Related U.S. Application Data (60) Division of application No. 12/109,960, filed on Apr. 25, 2008, now Pat. No. 8,027,917, which is a continuation-in-part of application No. 11/464,694, filed on Aug. 15, 2006, now abandoned, application No. 13/195,404, which is a division of application No. 13/101,317, filed on May 5, 2011.

(60) Provisional application No. 60/913,964, filed on Apr. 25, 2007, provisional application No. 60/915,139, filed on May 1, 2007, provisional application No. 61/331,469, filed on May 5, 2010.

(51) Int. Cl.
*G06Q 40/00* (2012.01)
(52) U.S. Cl. .......................................................... 705/39
(58) Field of Classification Search .................. None
See application file for complete search history.

(56) References Cited

U.S. PATENT DOCUMENTS

| | | |
|---|---|---|
| 5,594,226 A | 1/1997 | Steger |
| 5,848,400 A | 12/1998 | Chang |
| 5,930,767 A * | 7/1999 | Reber et al. ................ 705/26.41 |
| 6,138,911 A | 10/2000 | Fredregill |
| 6,678,664 B1 | 1/2004 | Ganesan |
| 6,684,195 B1 | 1/2004 | Deaton et al. |
| 6,704,714 B1 | 3/2004 | O'Leary et al. |

(Continued)

FOREIGN PATENT DOCUMENTS

WO   WO 02/14985   2/2002

(Continued)

OTHER PUBLICATIONS

Mark J. Cotteleer, et al., Cutting Checks: Challenges and Choices in B2B E-Payments, Communications of the ACM, Jun. 2007, pp. 56-61, vol. 50, No. 6.

(Continued)

*Primary Examiner* — Jason M Borlinghaus (74) *Attorney, Agent, or Firm* — Feldman Gale, P.A.; Michael C. Cesarano (57) ABSTRACT

A new medium of tender employs both a primary barcode and a merchant specific extension barcode that are both associated with specific consumers. The system operates within preexisting merchant platforms and links merchant systems, POS systems, inventory systems, SKU systems, barcode readers and a server. The system allows the ready linking and access of consumer transaction related information including purchase history, credit information, merchandise details and similar information. It further allows for the ready remittance of payment via the ACH network through the eCache computer network or other funding networks based on criteria established by the merchant itself. It further facilitates the administration of consumer rewards or loyalty programs and also facilitates consignment arrangements between suppliers and merchants.

1 Claim, 5 Drawing Sheets

U.S. PATENT DOCUMENTS

| | | | |
|---|---|---|---|
| 6,842,739 B2 | 1/2005 | Postrel | |
| 7,536,336 B1 | 5/2009 | Guinan | |
| 7,815,107 B2 | 10/2010 | Kingsborough et al. | |
| 2002/0023027 A1 | 2/2002 | Simonds | |
| 2002/0052853 A1 | 5/2002 | Munoz | |
| 2002/0087469 A1 | 7/2002 | Ganesan et al. | |
| 2002/0120846 A1 | 8/2002 | Stewart et al. | |
| 2002/0123926 A1 | 9/2002 | Bushold et al. | |
| 2002/0128967 A1* | 9/2002 | Meyer et al. | 705/40 |
| 2002/0178112 A1 | 11/2002 | Goeller et al. | |
| 2003/0009382 A1 | 1/2003 | D'Arbeloff et al. | |
| 2003/0061093 A1 | 3/2003 | Todd | |
| 2003/0135457 A1 | 7/2003 | Stewart et al. | |
| 2003/0200144 A1 | 10/2003 | Antonucci et al. | |
| 2004/0039701 A1 | 2/2004 | Nakamura et al. | |
| 2004/0122736 A1 | 6/2004 | Strock et al. | |
| 2004/0199466 A1 | 10/2004 | Chi | |
| 2004/0200898 A1 | 10/2004 | Kepecs | |
| 2005/0015332 A1 | 1/2005 | Chen | |
| 2005/0035192 A1 | 2/2005 | Bonalle et al. | |
| 2005/0043992 A1 | 2/2005 | Cohagan | |
| 2005/0080697 A1 | 4/2005 | Foss, Jr. et al. | |
| 2005/0102188 A1 | 5/2005 | Hutchison et al. | |
| 2005/0149394 A1 | 7/2005 | Postrel | |
| 2005/0192896 A1 | 9/2005 | Hutchison et al. | |
| 2005/0192897 A1 | 9/2005 | Rogers et al. | |
| 2005/0261984 A1 | 11/2005 | Hutchison et al. | |
| 2006/0010033 A1 | 1/2006 | Thomas | |
| 2006/0074755 A1 | 4/2006 | Juetten et al. | |
| 2006/0074799 A1 | 4/2006 | Averyt et al. | |
| 2006/0084472 A1 | 4/2006 | Park | |
| 2006/0208064 A1 | 9/2006 | Mendelovich et al. | |
| 2006/0259364 A1 | 11/2006 | Strock et al. | |
| 2006/0287943 A1 | 12/2006 | Postrel | |
| 2007/0038515 A1 | 2/2007 | Postrel | |
| 2007/0106556 A1 | 5/2007 | Edwards et al. | |
| 2007/0129998 A1 | 6/2007 | Postrel | |
| 2007/0138259 A1 | 6/2007 | Dragt et al. | |
| 2007/0150411 A1 | 6/2007 | Addepalli et al. | |
| 2007/0175977 A1 | 8/2007 | Bauer et al. | |
| 2007/0179840 A1 | 8/2007 | Kroner et al. | |
| 2007/0276736 A1 | 11/2007 | Guilfoyle | |
| 2007/0299775 A1 | 12/2007 | Algiene | |
| 2008/0016003 A1 | 1/2008 | Hutchison et al. | |
| 2008/0046362 A1 | 2/2008 | Easterly | |
| 2008/0086420 A1 | 4/2008 | Gilder et al. | |
| 2008/0133339 A1 | 6/2008 | Drakoulis et al. | |
| 2008/0133350 A1 | 6/2008 | White et al. | |
| 2008/0140579 A1 | 6/2008 | Sanjiv | |
| 2009/0055271 A1 | 2/2009 | Drefs et al. | |
| 2009/0094118 A1 | 4/2009 | Antonucci et al. | |
| 2009/0108080 A1 | 4/2009 | Meyer et al. | |
| 2009/0132267 A1 | 5/2009 | Ganz | |
| 2009/0204496 A1 | 8/2009 | Otto et al. | |
| 2009/0299846 A1 | 12/2009 | Brueggemann et al. | |
| 2009/0299865 A1 | 12/2009 | Budgen | |
| 2009/0307072 A1 | 12/2009 | Morales-Lema | |

FOREIGN PATENT DOCUMENTS

| | | |
|---|---|---|
| WO | WO 02/097699 | 12/2002 |
| WO | WO 03/107289 | 12/2003 |

OTHER PUBLICATIONS

Edward J. Potter, Customer Authentication: The Evolution of Signature Verification in Financial Institutions, Journal of Economic Crime Management, Summer 2002, vol. 1, Issue 1.

* cited by examiner

METHOD FOR FACILITATING FINANCIAL AND NON FINANCIAL TRANSACTIONS BETWEEN CUSTOMERS, RETAILERS AND SUPPLIERS

CROSS-REFERENCE TO RELATED APPLICATIONS

The present application is a divisional patent application and claims priority benefit under 35 U.S.C. §121 from U.S. Utility patent application Ser. No. 12/109,960, filed Apr. 25, 2008 and U.S. Utility patent application Ser. No. 13/101,317, filed May 5, 2011, and further claims priority benefit under 35 U.S.C. §119(e) of U.S. Provisional Patent Application Ser. No. 60/913,964, filed Apr. 25, 2007 and U.S. Provisional Patent Application Ser. No. 60/915,139, filed May 1, 2007 and U.S. Utility patent application Ser. No. 11/464,694 filed Aug. 15, 2006. The disclosures of these applications are incorporated herein by reference.

FIELD OF THE INVENTION

The present invention relates to the facilitation of certain financial and nonfinancial transactions between customers, retailers and suppliers.

BACKGROUND OF THE INVENTION

The volume of electronic payment transactions executed with general purpose cards such as credit cards, debit cards, both "online" and "offline", and ATM cards at the point of sale ("POS") account for 28.5% of consumer spending in 2005 up from 12.6% in 1995. Notwithstanding, by 2010, such payments are expected to grow by 70% further eroding the profitability of merchants. The system for executing electronic transactions is currently determined by card issuing banks, card associations, EFT networks and processors which charge substantial fees for processing these transactions in the form of interchange. Today's card payment networks are grossly inefficient and layered with cost. Each time a card association, EFT network or processor touches a transaction they add fees in the form of interchange. Those transaction fees are borne by the merchant, passed on to the customer and continue to rise. United States interchange fees have increased 29% since 1995. At present the transaction fee paid by the merchant for a relatively moderate purchase of $100.00 can approach $3.00. It will be readily seen that given the already large and increasing percentage of POS sales that are executed using general purpose cards such as credit cards, debit cards and ATM cards, these transaction fees have a significant impact on merchant profitability. Since a greater number of transactions are subject to interchange fees the total cost of interchange to merchants have tripled in the last ten years. As the trend toward increasing usage of such payment mechanisms continues to rise, the transaction fees will similarly increase. In 2005 American merchants paid nearly $50 Billion to accept credit cards.

This presents a dilemma for merchants because while customers generally like the convenience of using such devices for completing purchases, the transactions continue to grow more costly. On average credit card transactions cost American Merchants six times as much as cash transactions and twice as much as checks or PIN based debit cards.

| Average cost per transaction of accepting payments for U.S. retailers in 2000 | | | | |
| --- | --- | --- | --- | --- |
| CREDIT CARDS | OFF-LINE (SIGNATURE) DEBIT CARDS | CHECKS | ON-LINE (PIN) DEBIT CARDS | CASH |
| Average Cost Per Transaction $0.72 | $0.72 | $0.36 | $0.34 | $0.12 |

Furthermore, while customers generally like using checks for payment, the use of checks has been in decline. Furthermore while customers generally like using checks for payment they are not as convenient as cards hence there use their use has been in decline. Accordingly, there is a need to provide consumers and merchants with a real alternative to the disadvantages of the current methods of payment while preserving the advantage of payment by check.

Furthermore, because conventional debit cards, credit cards and ATM cards are under the control of the issuing banks, card associations, EFT networks and processors merchants must comply with the dictates of these institutions and have no control over the processes. These merchant restraints are designed to restrict merchants' options as to what type of payment systems they can accept and how they can price them, and force merchants to bundle the pricing of payment systems with the underlying goods and services being sold. In effect, all consumers underwrite the increased costs of general purpose cards in the form of higher prices for all consumers, even those who pay by cash. Another disadvantage is that merchants have no ability to identify a specific customer by name, address, telephone number, e-mail address or other identifying data and link them to consumer purchase information within transaction related databases. Such information is of tremendous potential value to merchants as it may allow the tracking of transaction related data, so-called "basket metrics" and the relationship of that data to the specific customer. Basket-metrics can include information without limitation, such as item count, sales amount, demographics concerning customers and store location, responsiveness to promotions such as coupon or special promotion codes and customer related data concerning the purchase frequency, volume and value on a per customer basis over the lifetime of a shopping relationship. Without the ability to readily track that information and associate it to individual consumers whose names, addresses and other contact information is known, retailers lose the opportunity to directly target and market consumers on an individual basis.

Furthermore, as consumer purchases are currently effectuated, managing effective buyer loyalty or rewards programs is rendered difficult because such programs require the tracking of consumer purchases both in terms of number and volume. Unless merchants have an effective method for gathering, compiling and administering necessary transaction related data along with consumer specific data, reward and customer loyalty programs cannot effectively be managed.

In addition, merchants generally do not have access to consumer credit information including, of specific concern, readily accessible information regarding prior approvals or declines at the point of sale ("POS"). Occasionally a merchant will receive an approval from a credit card issuer only to later find out that the approval was based upon a "stand in" event when the customer's actual balance information was unavailable. Thus a merchant may complete a sales transaction only to have the transaction subsequently fail to close or be charged back. This occurs when a consumer is the victim of fraud, enters a dispute with their credit card company, or when a consumer with a poor credit history defaults, has insufficient funds, or otherwise precludes funding of the sales. Similarly, other customers may have an excessive rate of returns. That is, the customer may regularly purchase items but subsequently return them for a refund or other credit. Such customers may be considered less desirable or less profitable customers; information as to whom the merchant would like to be informed.

Finally, under current systems, managing effective consignment relationships is rendered difficult and time consuming as a result of the record keeping that must accompany such arrangements and the delays in settling accounts between the parties involved. Thus, for example, a supplier may be hesitant to enter into a consignment agreement because of the delays in receiving payments from merchants.

Accordingly, there is therefore a need for a retailer owned POS payment system which provides convenience to consumers, reduces and controls transaction costs for merchants, allows for the effective management of consignment relationships, and allows for merchant access to consumer transaction related information which the merchant can then use for a variety of purposes.

SUMMARY OF THE INVENTION

The present invention provides a method for facilitating financial and related non-financial transactions between customers, retailers and suppliers engaged in commercial remittance transactions performed over the internet, over wired and wireless telephone networks, and over local area networks including but not limited to WiFi systems. The system uses a proprietary network (a virtual private network) that interfaces with merchants who are registered to use the eCache system, which is the proprietary network and system that is referenced in this application and patent application Ser. No. 11/464,694 which is hereby incorporated by reference. The transaction related data that eCache stores and accesses may be stored either within the merchant's own system or on eCache servers which are external to the merchant's system. The eCache decision making process may similarly occur within the merchant's system or on the eCache server or system of servers.

The system bypasses conventional card processing infrastructure by providing and utilizing a link between the retailer's POS system and the ACH network. The Automated Clearing House (ACH) is a central clearing facility operated by a private organization or a Federal Reserve Bank (FRB) on behalf of Depositor Financial Institutions (DFIs). Participating DFIs transmit or receive ACH entries that allow for transactions to be funded from a customer checking account or a pooled account established for reward and loyalty transactions as an ACH transaction. Users are cross-referenced to bank accounts (demand deposit accounts, or 'DDAs') they control, and through which the user can make withdrawals, or settle accounts on the internet. Banks are identified using a bank identification number. An additional link allows general purpose cards such as credit cards, debit cards, charge cards and prepaid cards to be switched to and authorized through a merchant processor network, association network, debit network or ATM network, where they may be used to complete a sales transaction. General purpose card transactions and eCache transactions may be routed through a server switch resident within the merchant's POS or other systems at the merchant location.

A server switch or eCache server switch is a server that contains proprietary software that reviews transaction data to validate input data, link to internal or external databases, approve or decline transactions based upon a rules database applied to input data and its internal or external databases. The server switch also contains routing preference tables which allow a transaction to be routed to external debit or credit networks based upon the lowest cost of that transaction to a retailer. The eCache Server issues instructions to member banks that will be carried out on existing financial networks. In so doing, the eCache Server can make predetermined choices for structuring the transaction, taking into consideration such factors as transactional costs charged by other financial networks for various types of transactions, the time for settlement of the transaction, and the finality and immediacy to be accorded the transaction in real time. The eCache Server will instruct member banks to initiate monetary transfers. Such transfers may involve only internal bank transfers, or, such instructions may involve initiating an ACH transfer of funds between banks. As a general rule, regardless whether the transfer will be an intrabank transfer or will transfer money from one bank to another, the transaction will be initiated as a preformatted ACH CCD, that is, a request to initiate an ACH transaction. The server switch also stores decision data to be transmitted to an external server for additional processing. Such additional processing may include batching approved transaction data to an external server for submission to the ACH network or a credit or debit card network. The server switch also creates end-of-day settlement files that contain financial and non-financial data that are transmitted to external servers.

The VPN of this invention is hosted indirectly through member banks who are also directly connected to one of the ACH networks that provide banks with means to transfer funds between banks on behalf of their customers. The eCache Server is a proprietary server and network that is operated by an eCache Operator. The eCache Operator is authorized by member banks or other financial or non-financial institutions (collectively referred to herein as "banks") to originate ACH transactions with member banks on behalf of the banks' account holders through operating agreements with each member bank. When an operating agreement is executed with a bank, the eCache Server establishes a discrete, secure network connection to that bank, and creates potential indirect access for all that bank's demand deposit account (DDA) customers to the eCache Server.

The server switch may also be hosted externally by eCache. The server switch has the ability to distinguish between eCache transactions and general purpose card transactions. General purpose card transactions can be routed to selected merchant processors according to merchant established guidelines. eCache transactions can be approved or declined by the server switch or by the eCache server.

The eCache server switch connects the merchant retail inventory, POS and ACH networks and operates over existing retailer platforms. Depending on the degree of connectivity and the linkages between various retailer systems within a retailer's network environment, the eCache server switch may connect at one or multiple nodes. If, for example there are linkages between the merchant's POS system and inventory system, eCache may function by linking only to either the POS system or the inventory system. If the systems are not linked, depending on the functionality the retailer requires the eCache server switch may link separately to the various systems of the retailer. It may further integrate inventory systems, barcode readers, SKU systems, POS terminals and other existing retailer information systems. By operating within the inventory system of the retailer or supplier, the system allows for the automatic recordation of a complete transaction record incorporating a wide variety of sales related data. In addition, through use of the consumer specific bar codes, data from each transaction may be related to the individual consumer and associated with demographic data that further identifies the consumer.

The invention employs a new payment medium that includes a system of unique identification primary barcodes which are personal to a customer and may be tendered at the POS of a merchant or retailer. The primary barcode may be an International Standards Organization barcode, a Global Electronic Party Information Registry barcode, a UPC barcode, or any other type of barcode. There is no requirement that the barcode be any particular type as long as the primary barcode may be read or entered by a barcode reader at a merchant's POS.

Each customer-specific primary barcode is further linked to an extension barcode or barcodes. The extension barcodes are linked to specific retailers' POS systems and may also be linked to the retailers' inventory or SKU systems. To protect against barcode theft or fraud, the primary barcode will be further linked to a master barcode or other consumer identifier which may not be given to the consumer and will be maintained by eCache. The master barcode or other customer identifier allows eCache to associate and maintain specific consumer transaction related data with specific consumer accounts in a more secure environment. The consumer will not need access to the master barcode or other consumer identifier to complete a transaction but will be able to complete transactions using the primary and extension barcodes.

Each primary barcode is personal to a customer and may take many different forms. The barcodes may be imprinted on clear plastic sheets which may be affixed to retailer reward cards, identification cards, or existing third party credit, debit, prepaid or ATM cards. The barcodes may also be attached to other personal items such as wallets, cell phone cases, watches, or bracelets. It should be recognized that a wide variety of items may be used upon which to affix the adhesive barcodes and the above examples are set forth as examples, not as limitations. Moreover, the barcodes may themselves be imprinted on card blanks or any other suitable media. Any medium capable of retaining and displaying a barcode will suffice.

The primary barcodes are issued to qualified customers and allow for the ready payment of commercial transactions and further allow for the gathering of a wide variety of information related to the transaction. Qualified customers will have agreed to terms and conditions for use of the barcode system and may have submitted a wide variety of information in connection therewith. The information may include full name, address, telephone number, driver's license information, e-mail address or other identifying and demographic data. Such information may further include demand deposit account ("DDA") information, and account information concerning credit cards, debit cards, stored value or prepaid cards or payment methods. Customers using the eCache system will conclude and fund transactions by initiating an ACH transaction or a general purpose card transaction using one of the accounts.

In addition to the primary barcode, each customer is also provided with an extension barcode or barcodes which may either be assigned to the customer or selected by the customer. The extension barcodes are linked to a specific retailer and allow a customer the privilege of completing a sales transaction with that retailer who is a participant in the barcode program. For purposes of security against barcode theft or fraud, an individual's master barcode may not be given to the individual, but may be maintained by the eCache system and linked to one or more primary barcodes issued to the individual for day in and day out usage. The extension barcode may be a scanable barcode or may take the form of a series of numbers or characters that may be entered by key pad or other mechanism When a customer wishes to purchase items using the eCache system, the customer will present these items to the cashier who scans the items as with any other typical purchase. The customer then tenders his or her primary barcode to the cashier, other POS personnel or could, for example, input the primary barcode himself or herself, as in the case of a self-checkout lane. The merchant's POS system will then transmit the barcode to the eCache server switch which will validate the barcode and prompt the customer for entry of his or her extension barcode. The extension barcode may consist of multiple numbers, letters or some combination thereof. The merchant's POS system may also be configured or adapted to prompt for the extension barcode without the necessity of routing to the eCache server switch. Each extension barcode is constructed in such a manner that a predetermined digit, e.g., the last digit, will determine from which account the customer will complete the sales transaction. For example, the last alpha or numeric digit might contain an "A", "C", "D" or "1", "2", or "3" designating any one of a number of different funding sources or providing for a default to a demand deposit account. Where the customer selects "D" or "3", they may, for example, direct the sales transaction to be paid from their debit card account.

Once the primary barcode has been validated and the customer has entered the extension barcode, the merchant's POS personnel enter the purchase items as they would ordinarily. When the total sales are "rung up" and the customer has presented the barcodes, the totals, now associated with the extension barcode, are routed to the eCache server switch for either an approval or decline of the sales transaction. The approval process may include the use of databases that contain negative and positive transaction data related to the consumer who has presented the barcode for validation. Such other information may be of significance to a retailer, such as an "excessive returns" database. For instance, if the customer had previously presented a barcode in connection with a sale that has previously been approved but which was subsequently denied before being funded, the transaction would be posted to a negative database, and would remain associated with that customer. Thus when the same customer presented the barcodes for a later sales transaction, the merchant would have access to the associated negative history. Positive transactions associated with a customer through the bar code system would likewise be recorded and available for the merchant's information, or to other merchants in the eCache network. Transactions could also be approved or declined after reviewing a merchant return database. A history of excessive returns may result in a declined transaction.

If the purchase is approved, then settlement of the purchase may proceed as an ordinary ACH settlement, or a credit settlement, or by any other suitable method. Settlement of an eCache Server transaction occurs when available funds are transferred in consideration of an obligation and the transfer has been recorded in each party's account, which may be a bank account (DDA).

Another function of the system allows for a subsequent confirmation by routing the requested transactions through an external verification service. Such service may include, without limitation, check guarantee services, credit bureaus, or credit, signature debit or PIN debit authorization services for a further approval or decline. Thus, whether eCache issues an approval or a decline, the system allows for further validation of the transaction if the merchant so desires. Contingent upon the result of that process, the merchant can determine whether to proceed and complete the transaction or to decline it. As stated above, depending on the result of that process, the consumer's purchase can be settled using an ACH route, or credit route, or any other acceptable means to fund the transaction.

Another aspect of the invention involves the administration of buyer reward and buyer loyalty programs. Under a typical reward or loyalty program, qualified consumers "earn" future discounts, gifts, or even refunds, based on how often they shop at a particular retailer and the value of the consumers' spending at that retailer. Under a usual system, the more a consumer spends, the more he or she "earns" as a reward for their continued patronage. The difficulty arises, however, in compiling and maintaining a sufficient database of information to allow for the administration of the program. Cashiers or other POS personnel, for example, would have difficulty in recording and entering the sort of data needed to run such a program manually. The present invention, however, allows for the automatic compilation of sales transaction data by utilizing the link between the retailer's inventory system, the POS system, and the merchant's barcode readers coupled with the customer's extension barcode. Thus purchases by qualified consumers are tracked and maintained by the system and can be used to administer and manage buyer rewards or loyalty programs.

As a concomitant to establishing a buyer reward or loyalty program, the present system allows a merchant a simple and practical method of ensuring that such programs are properly funded. Depending on the design of the program by the merchant, the eCache system is capable of earmarking a predetermined percentage or fixed amount of any sales transaction for the purpose of funding a pooled reward account. Thus the merchant is in a position to ensure that there are adequate resources to fund the rewards program.

The eCache system further facilitates consignment relationships between suppliers and merchants. In a typical consignment transaction, the merchant agrees to carry a stock of merchandise for the buyer but has not yet purchased the item from the supplier. If the item is sold, the merchant remunerates the supplier for the item while retaining a portion as profit or fee. Such commercial relations are time consuming and difficult to administer as adequate records of the sale must be maintained to ensure both retailer and supplier are properly compensated. There are often further delays associated with the final settling of accounts between the merchant and supplier. For example, the merchant may wish to ensure the customer's transaction is finally settled before settling with the supplier. By residing within the merchant's POS and inventory system, eCache allows consignment items to be recognized and, under appropriate circumstances based on criteria of the merchant, to be settled quickly with both customer and supplier.

It is thus an object of this invention to utilize existing systems and networks including POS systems, retailer inventory system, SKU systems and ACH networks to link consumer transaction data to individual consumers so that such information may be used to evaluate whether to allow a purchase to conclude.

It is further an object of this invention to provide an alternative medium of exchange without the excessive interchange fees that accompany typical credit and debit transactions.

It is a further object of this invention to provide a system for gathering data, so-called "basket metrics" and linking such data to particular consumers so that the merchant may use the information to more effectively market to and target consumers.

It is another object of the present invention to provide a system in which a merchant can compile a database of consumer information related to consumer purchasing that can be modeled to more effectively target new consumers or increase sales to existing consumers.

It is another object of the instant invention to provide a system for gathering consumer transaction related data for administering effective buyer reward and loyalty programs.

It is another object of this invention to allow for the effective tracking of consumer purchasing information so that merchants may assemble profiles of consumers for determining which customers are high value customers and which are not.

It is a further object of the instant invention to allow a system whereby a merchant may designate portions of each customer transaction for funding a pooled reward account through which buyer reward and loyalty programs may be funded.

It is a further object of this invention to provide a system that can facilitate traditional consignment relationships, including the timely remuneration of the parties thereto.

DETAILED DESCRIPTION OF THE PREFERRED EMBODIMENTS

Figure 1:
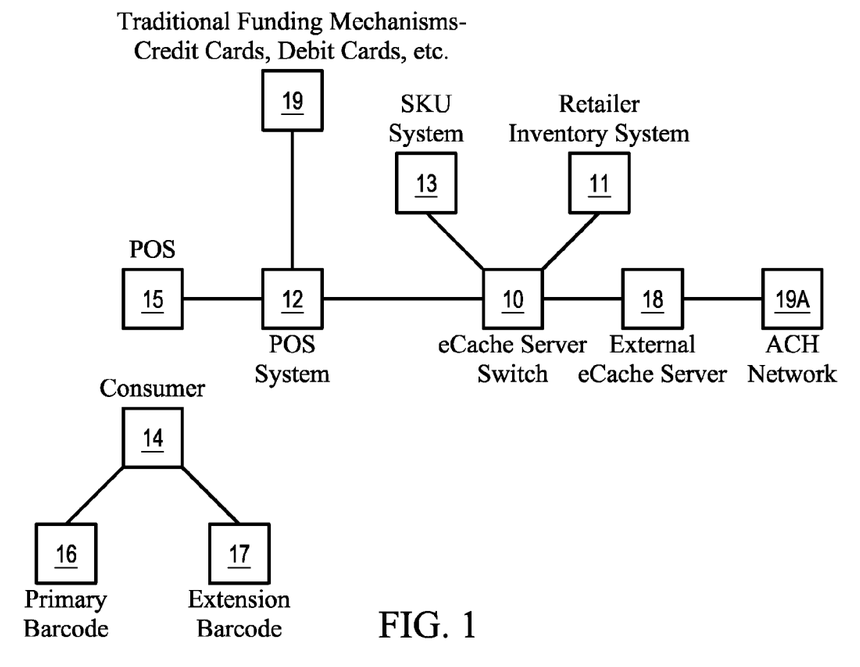
FIG. 1 is a diagram depicting an embodiment of the invention.

FIG. 1 depicts one embodiment of the invention. Here the eCache server switch, 10, is linked to the retailer's inventory system, 11, and to the retailer's POS system, 12 and to the retailers' SKU system, 13. Depending on the connectivity of the retailer's systems and network, the eCache server switch, 10, may be directly linked to only one node, or as here, by way of example, to multiple nodes. The eCache server switch may be linked to an external eCache server or servers. A further link, 18, between the eCache server switch and the ACH network, 19A, allows for transactions to proceed as ACH transactions. Because eCache does not displace and preclude the use of other payment systems, there will typically be a further link, 19, that allows payments to proceed via traditional methods such as credit cards, debit cards or similar devices. A transaction according to the present invention may include a consumer, 14, who after presenting items to the cashier for scanning or totaling, presents his or her primary barcode, 16, at the retailers POS reader or input keyboard, 15. The primary barcode, 16, has been assigned to the consumer. An extension barcode, 17, is also assigned or may be selected by the consumer. The individual customer's primary barcode, 16, and each extension barcode, 17, is linked to a consumer in the eCache system.

Figure 2:
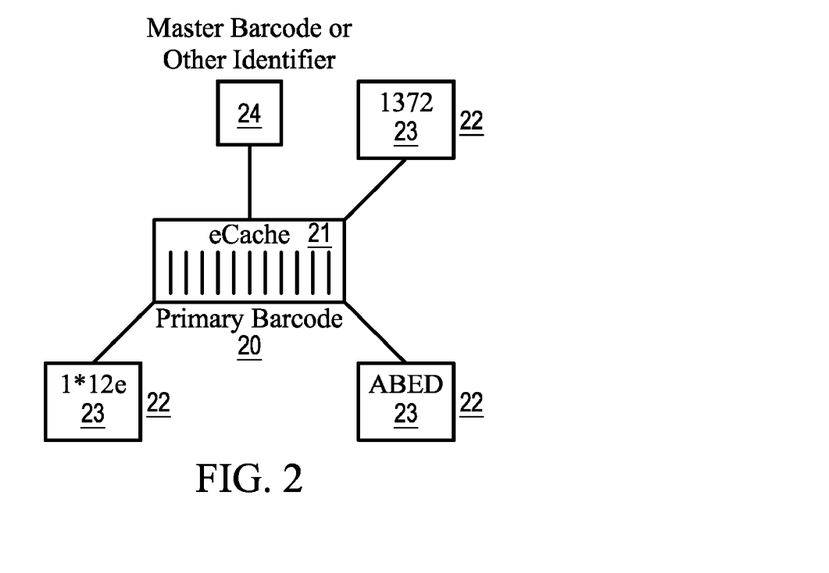
FIG. 2 depicts an embodiment of the invention in which primary and secondary barcodes are linked to a master barcode or other identifier.

FIG. 2 depicts the linkage. In FIG. 2, the barcode, 20, may be affixed to any medium such as an identification card, a credit card or even a personal item such as an article of jewelry. It may further be marked with an eCache logo, 21, or other signifier showing that the barcode is linked to the eCache network. The customer's primary barcode is cross referenced to various retailer-specific extension barcode barcodes, 22, that have been selected by or assigned to the consumer. FIG. 2, also depicts a primary barcode and multiple retailers to which it can be linked via the extension barcodes, 22. The extension barcode, 22, may be configured so that a predetermined digit, e.g., the last digit, 23, of the barcode will identify from which source a consumer will fund the transaction. The extension barcode may, for example, be a four character barcode wherein the last character designates which from which account payment will be made. In one example the extension barcode will terminate in "D" might also be a number signifying that the consumer wishes to fund the transaction from a Demand Deposit Account. The primary barcode, 20, is linked not only to the user's extension barcodes, 22, but also to a master barcode or other customer identifier, 24, that may not be known to the user. This secure master barcode protects against fraud and theft and allows for eCache to readily maintain an associated consumer database.

Figure 1A:
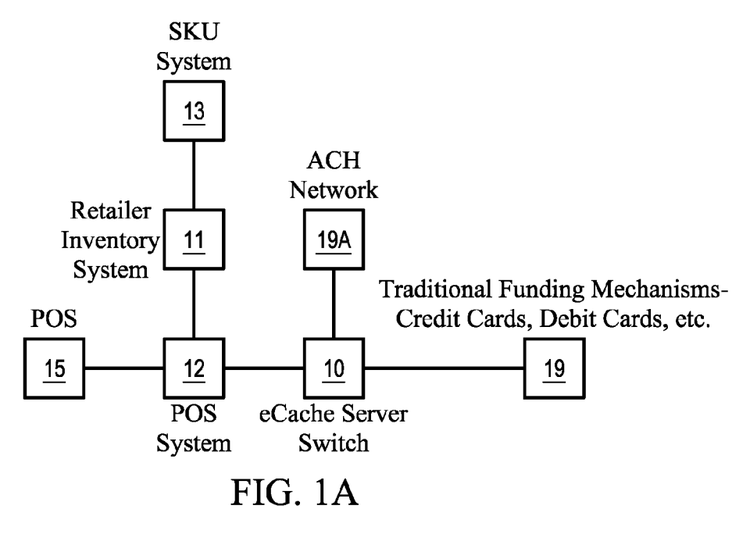
FIG. 1A is a diagram depicting another embodiment of the invention in which a merchant's computer network includes a POS system, an SKU system, and an inventory system.

FIG. 1A shows another embodiment of the system. Here the merchant's computer network environment exhibits a high degree of connectivity. In this embodiment, the merchant's retailer inventory system, SKU system and POS system are all interconnected. The eCache system may therefore for operate by connecting the eCache server switch to any one node on the system, here, for example, to the POS system which is itself further linked to the merchant' SKU system and inventory system. In this embodiment, the ACH network as well as traditional payment mechanisms are accessed through the eCache server switch.

In yet another embodiment of the instant invention, all traditional funding mechanism transactions are routed to an external eCache server switch. eCache would then aggregate such transactions from multiple retailers to submit to a traditional funding processor to garner lower volume pricing for these transactions than what retailers might have been able to negotiate on their own.

Figure 3:
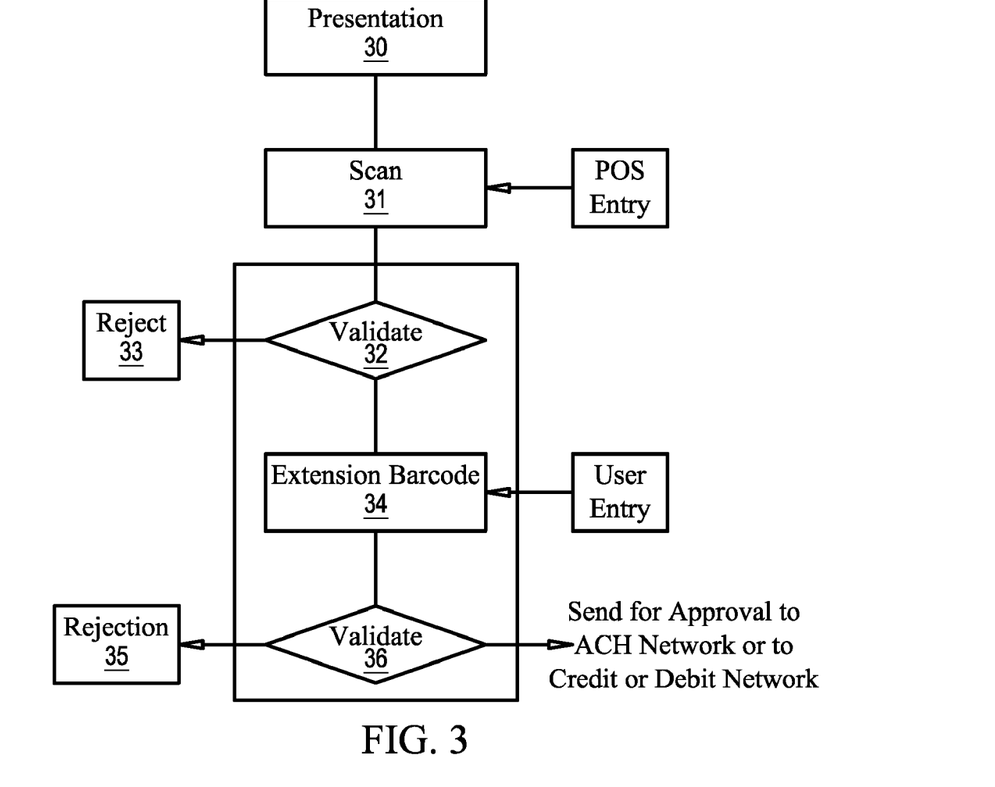
FIG. 3 is a flow chart depicting an embodiment of the invention.

FIG. 3 shows the system in use. The consumer presents his primary barcode, 30, to the cashier or merchant personnel. The cashier scans the primary barcode, 30, through a reader or otherwise enters, 31, the primary barcode, 30, into the POS system. The primary barcode information is transmitted over the network via a communications link to the eCache server switch for validation and confirmation that the user is authorized to use eCache, 32. If the barcode is not recognized, or if the account is otherwise barred, the system issues a rejection, 33. If the primary barcode, 30, has been validated, eCache sends a further prompt, 34, requiring the consumer to input the extension barcode, 36. eCache may decline to approve the extension barcode depending on various criteria and issue a rejection, 35. If eCache further approves the extension barcode, 36, the consumer is allowed to continue the purchase via eCache. eCache will then send the requested transaction for an approval or decline of payment. Additionally, the merchant's POS system may itself prompt for the extension barcode. Alternatively, the primary barcode may be transmitted via the eCache server switch to an external eCache server or bank of servers from which the extension barcode prompt is then generated.

In practice, a consumer may be issued as many extension barcodes as or he or she wishes one for each of the various participating merchants. If the consumer makes purchases at more than one retailer, he or she will have an extension barcode for each location. Thus the customer's primary barcode, 20, may be linked to numerous extension barcodes, 22, each one being specific to a given retailer. FIG. 2 depicts this linking of primary barcode, 20, to extension barcodes, 22. Because the customer enters the extension barcode at the POS, the customer may select from which account he or she will fund the transaction by varying the last digit, 23. The customer can therefore direct that the transaction be completed from his or her checking account, debit card account, demand deposit account, or other suitable source.

Figure 4:
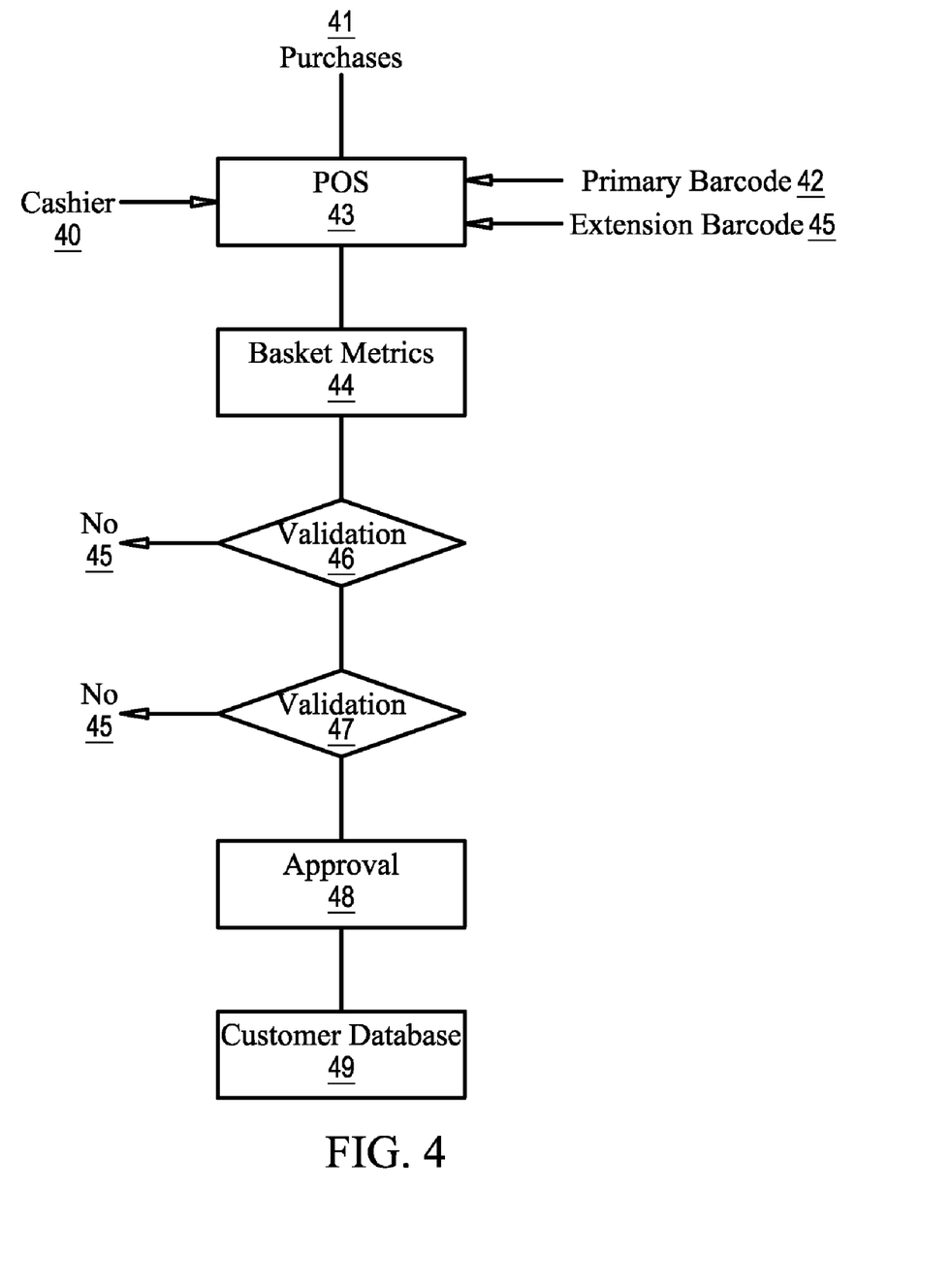
FIG. 4 is a flow chart of another embodiment of the invention.

In a typical transaction, FIG. 4, once the cashier or other sales person, 40, processes a consumer's purchases, 41, the consumer will tender his or her barcode, 42, to the cashier for input into the barcode reader at the POS, 43 and for validation as described herein. In one aspect of the present invention, the POS system has recorded various "basket metrics", 44, associated with the consumer's attempted purchases, 41. As outlined above, eCache may issue a rejection, 45, terminating the transaction as an eCache transaction. Assuming validation occurs, however, upon validation of the primary barcode, 42, validation of the extension barcode, 43, and approval, 48, the consumer's purchases, 41, are associated with the consumer and stored in a database, 49. Thus, as the consumer's purchases, 41, are entered into the retailer's POS system, the eCache system via a communications link to the eCache server switch, 47, records such data as item quantity, price, total amount, store location, use of coupons or other promotion codes, and other data that may reflect pertinent transaction-related data concerning the exchange. Some retailers, as an alternative, might compile the purchase metrics and transfer the information to eCache at a later time. The transaction data is associated with the customer's primary barcode or extension barcode in a transaction database, 49, so that the merchant will have access to the information. The merchant will therefore be able to assemble a profile and history of the consumer as transactions are completed and stored by the system. The resultant transaction data may then be used by the merchant in formatting marketing strategies or for other similar purposes. Given the growth of data mining techniques, the transaction data may also be exchanged with various companies that use such data. Thus, the system of this invention allows the merchant to realize a strategic asset from the costs of executing a transaction where as, without the invention, transaction costs will typically go unrecovered by the merchant.

Figure 5:
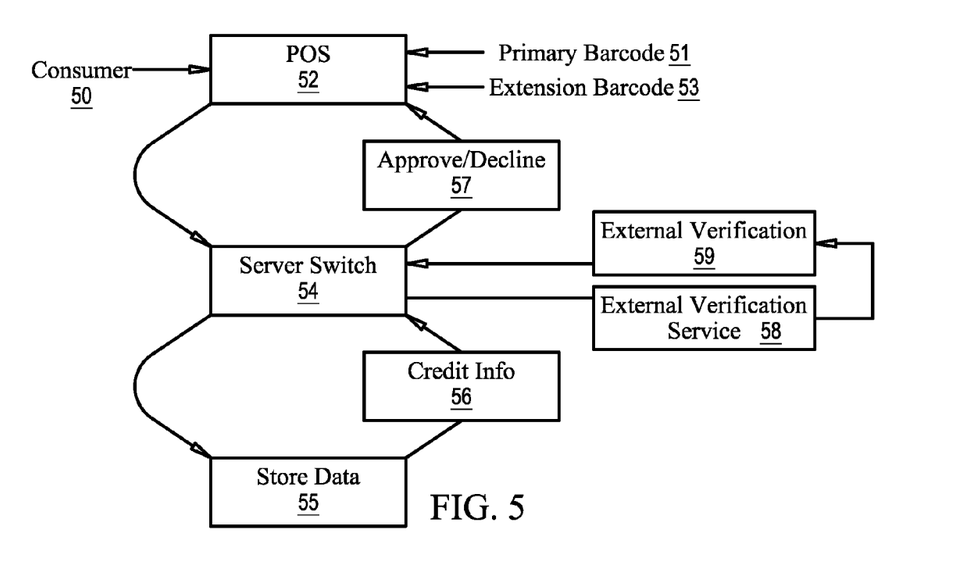
FIG. 5 is a flow chart depicting another embodiment of the invention.

The present invention incorporates additional functionality as well, and allows the merchant to track and access credit information of the consumers who use the system. This is depicted in FIG. 5. Thus in one aspect of the present invention, a consumer, 50, presents his or her primary barcode, 51, for validation at a retailer's POS, 52. Upon being prompted, the consumer enters his or her extension barcode, 53. Upon validation of the extension barcode, the eCache system, through the eCache server switch, 54, accesses stored data, 55, related to the history of the consumer's transactions. eCache can then issue an approval or decline based on criteria formulated by the merchant or other entity and stored on the eCache server switch or external eCache servers. The approval or decline is then transmitted to the merchant at the POS, 52. The criteria may be entered into the system by eCache personnel. Additionally, in other embodiments, the merchant itself may enter the approval or decline criteria.

The decision to accept or decline the transaction may be made based solely upon the information stored in the database from a specific retailer, or it might be a compilation of transactions with all eCache merchants. Further, the database may be updated periodically on, for example, an hourly basis. In FIG. 5, the consumer, 50, has presented the primary and extension barcodes for validation at the retailer's POS, 52. ECache now accesses stored data based on prior transactions or attempted transactions, 55. In this example the consumer has previously completed a purchase, for example, from a credit card account, which subsequently was declined. Ordinarily, a merchant would not have access to this information but the eCache system accesses the stored credit transaction data, here negative data, which has been stored in a database, 55 and that has been associated with the consumer, 50. Based on eCache's evaluation of the negative data, 56, a decision may be made and eCache can approve or decline the transaction, 57.

Alternatively, through another communications link, 58, eCache may connect to an external verification service, 56, such as check guarantee services, or credit bureau or credit, signature debit or PIN debit authorization services, for a further approval or decline. Depending on the results of that verification, 59, eCache can formulate a decision to allow or decline the transaction.

Similarly, eCache allows for previously stored positive transaction data to be used by the merchant in formulating an approval or decline or for other purposes including targeting specific marketing material to profitable customers. Such information, like negative information, may be shared with other eCache merchants. In that case, the information is drawn from stored databases of positive and negative transaction-related data, including, excessive return information, and can be used by all eCache merchants to determine whether and on what terms a transaction can be approved. It should be appreciated that these decision-related functions may take place within the merchant's own system. Alternatively, the relevant data may be transmitted to an eCache server or server bank where the data may also be stored and where approvals or declines may also be formulated.

eCache also allows decisions whether to close a transaction to be based on other criteria. As an example, a customer may have had an excessive history of returns, i.e., the return of merchandise previously purchased for a refund. eCache allows the merchant to track returns by customer. This information is entered into a database as stored data detailing excessive returns. When the eCache barcode is presented at the POS, eCache can access the stored data to determine whether the customer has had a history of excessive returns and, depending on merchant established criteria, can issue an approval or decline.

Figure 6:
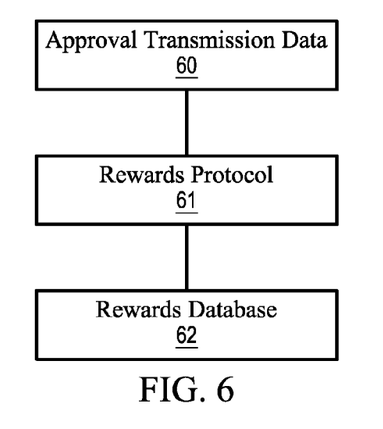
FIG. 6 is a diagram depicting an embodiment of the invention showing an awards program.

Another aspect of the present invention allows the merchant to track purchases and sales for purposes of administering buyer loyalty and rewards programs. Thus in one embodiment of the current invention, eCache will track an individual consumer's purchases by amount, type and quantity for the purposes of determining eligibility for participation in such programs as might be established by the merchant. FIG. 6 depicts a rewards program in operation. Where a retailer has established such a program, the retailer will establish a schedule or rules, 61, concerning eligibility for rewards and the administration of such a program. Rewards may include, for example, discounts, merchandise or even cash back to frequent or high volume purchasers. Typically, a customer's eligibility to participate will depend on the value of purchases or frequency of purchases that he or she has made. Thus upon presentation by a consumer of the primary barcode and extension barcode at the merchant's POS, eCache, upon receipt of the extension barcode will compile and record the transaction data which is applied to the schedule or rules, 61. The results of that process are associated with the consumer through the extension barcode and primary barcode for purposes of administering the reward program and stored in the rewards database. Subsequently, eCache can access such stored data as to volume or value of previous purchases by a customer from the retailer to determine whether and to what extent a consumer qualifies for any perquisites as a participant in a rewards program.

The eCache system further allows a merchant to ensure that any programs he or she may establish are adequately funded from the consumer's purchases. The system thus allows the merchant to designate that a portion of any sales transaction be used for purposes of funding a pooled reward account that is in turn used to fund the reward or loyalty program.

Figure 7A:
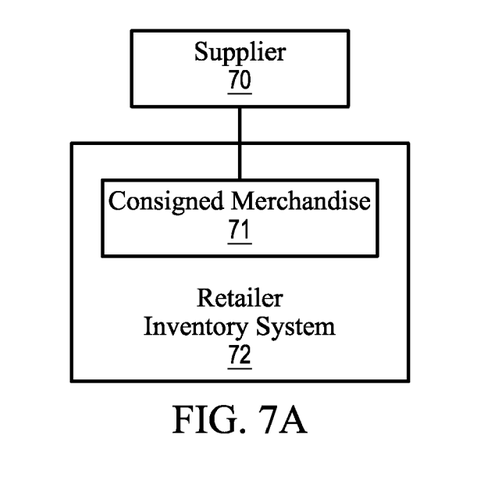
FIG. 7A is a diagram depicting an embodiment of the invention representing a consignment transaction.

Another embodiment of the present invention illustrates its use in managing effective consignment relationships. FIG. 7A depicts a typical consignment transaction using the eCache system. Here, the supplier, 70, has consigned merchandise, 71, for sale at the retailer location. The consigned merchandise, 71, has been designated as such in the merchant's inventory system, 72.

Figure 7B:
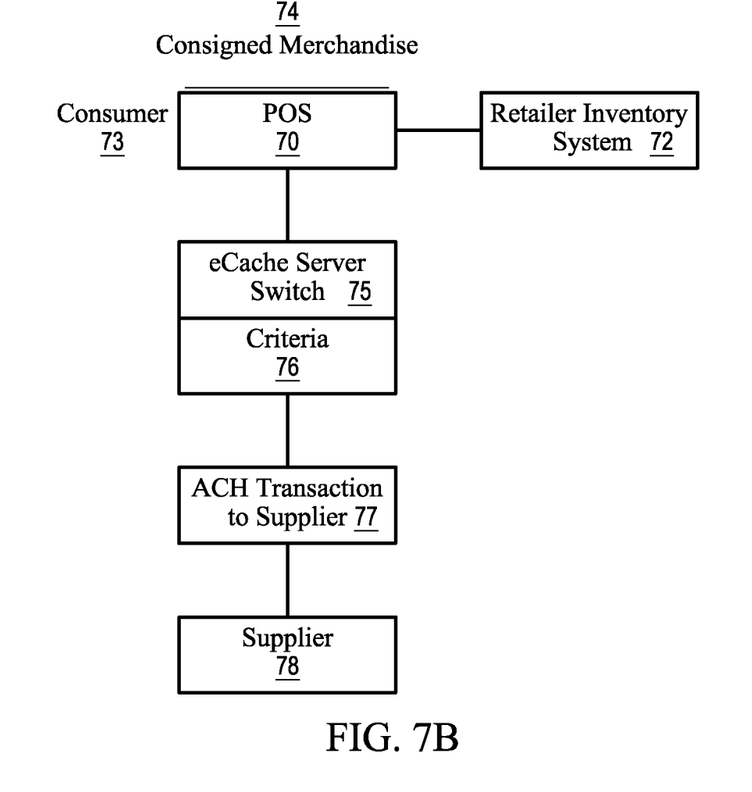
FIG. 7B is a diagram depicting another embodiment a consignment transaction.

In FIG. 7B, a consumer, 73, who wishes to purchase the consigned merchandise, 74, will present the items for entry at the POS, 75. The cashier will scan the consignment items and the consumer will tender the eCache barcode and extension barcodes for payment. The POS communicates with the retail inventory system, 72, and determines that the merchandise has been consigned by a supplier. The retailer POS system then transmits this information to the eCache server switch, 75. The merchandise is recognized as consigned merchandise and, according to predetermined criteria, 76, previously entered by the merchant, eCache assigns a percentage or portion of the price to be remitted via an ACH transaction, 77, to the supplier, 78 in settlement of the relationship. eCache allows great flexibility to a merchant to determine the terms and details of any consignment relationship including the time of remittance of payment to the supplier, depending on the specific profile of a given customer.

What is claimed is:

1. On a computer network comprising at least a merchant's computer network including a point of sale (POS) device connected to said network, a virtual private network (VPN), at least one consignor's computer network, an automated clearing house (ACH) network capable of funding financial transactions, one or more accounts controlled by a customer for funding a transaction, at least one of said one or more accounts being a demand deposit account (DDA) maintained by a bank, said DDA being accessible through said ACH network for funding financial transactions, each said network being linked to a server, a method of managing consignment sales comprising the steps of:

storing on said server information that identifies said customer and said one or more accounts controlled by said customer including said DDA, said information comprising at least an account number that identifies said DDA and an identification number identifying said bank where said DDA is maintained;

creating a customer specific primary barcode and at least one extension barcode linked to said primary barcode;

associating said primary barcode with said information that identifies said customer;

associating said extension barcode with said merchant;

transmitting said primary barcode to said server via said first VPN for validation that said customer is authorized to conduct transactions on said server;

receiving said validation;

transmitting said extension barcode to said server;

entering data representing said items for purchase into said POS device, associating said data with said customer, and sending said data to said server for approval of a purchase transaction of said items;

identifying items which are being sold on a consignment basis;

transmitting the consignment status of those items to the server switch;

receiving approval to transact a purchase of said items;

and if said account is said DDA, routing said transaction through said second VPN to said ODFI as an ACH transaction for processing and settling through said ACH network;

and if said account is not a DDA, routing said transaction through a network whereby said financial transaction is funded from said account;

allocating portions of the paid amount to one or more consignors and to said merchant based upon the application of predetermined rules by the server; and remitting the allocated portions to said one or more consignors and to said merchant in accordance with said application of predetermined rules by said server.

* * * * *